April 23, 1946.  C. L. EKSERGIAN ET AL  2,399,010
BRAKE
Filed May 14, 1942  4 Sheets-Sheet 3

INVENTORS
Carolus L. Eksergian
Paul W. Gaenssle and
Edward Kaiser
BY
John P. Darby
ATTORNEY April 23, 1946.    C. L. EKSERGIAN ET AL    2,399,010
BRAKE
Filed May 14, 1942    4 Sheets-Sheet 4

INVENTORS
Carolus L. Eksergian
Paul W. Gaenssle and
Edward Kaiser
BY John P. Jacbry
ATTORNEY Patented Apr. 23, 1946

2,399,010

UNITED STATES PATENT OFFICE 2,399,010

BRAKE

Carolus L. Eksergian and Paul W. Gaenssle, Detroit, and Edward Kaiser, Birmingham, Mich., assignors to Budd Wheel Company, Philadelphia, Pa., a corporation of Pennsylvania Application May 14, 1942, Serial No. 442,908

13 Claims. (Cl. 188—73)

The invention relates to brake mechanism and more particularly to heavy duty such mechanism adapted for use in tanks or the like.

It is an object of the invention to provide a device of this class which is simple and rugged in construction, which can be readily assembled and disassembled with the tank structures, which is readily accessible, and which can be readily manufactured at low cost.

It is a further object to provide a device of this class which can be kept adequately cool although the braking parts thereof are housed in a closed casing.

It is a further object to provide a compact brake mechanism which can be actuated by fluid-actuating means or mechanically and in which the mechanical means also serves as brake adjusting means.

These and other objects and advantages will become clear from the following detailed description when read in connection with the appended drawings forming a part of this specification.

Figure 1:
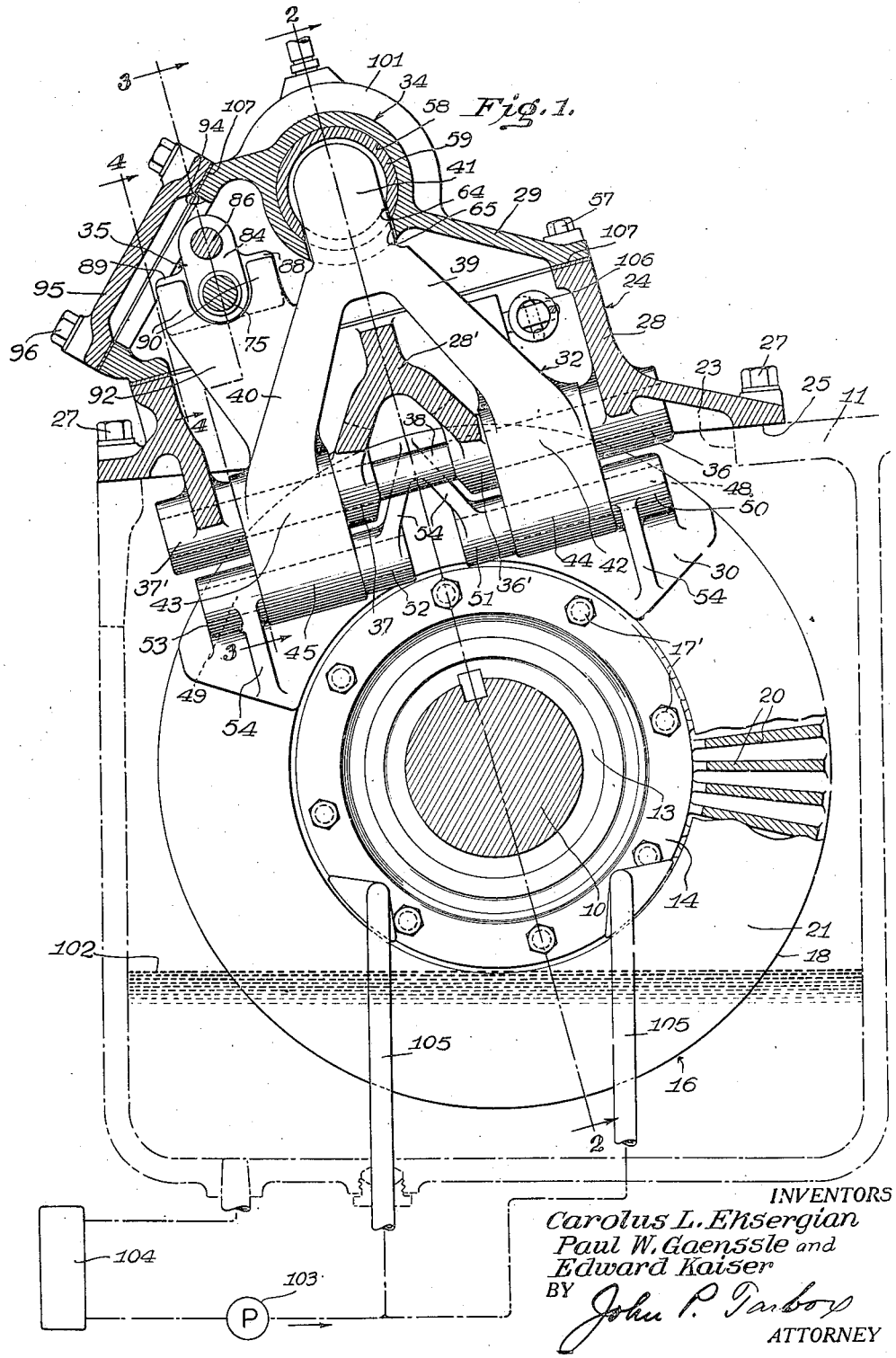
Fig. 1 is a sectional view through the brake mechanism, parts associated therewith being shown in dot-and-dash lines, the section being taken substantially on the line 1—1 of Fig. 2 looking in the direction of the arrows at the ends of the section line, a cooling system being shown more or less diagrammatically.
Figure 3:
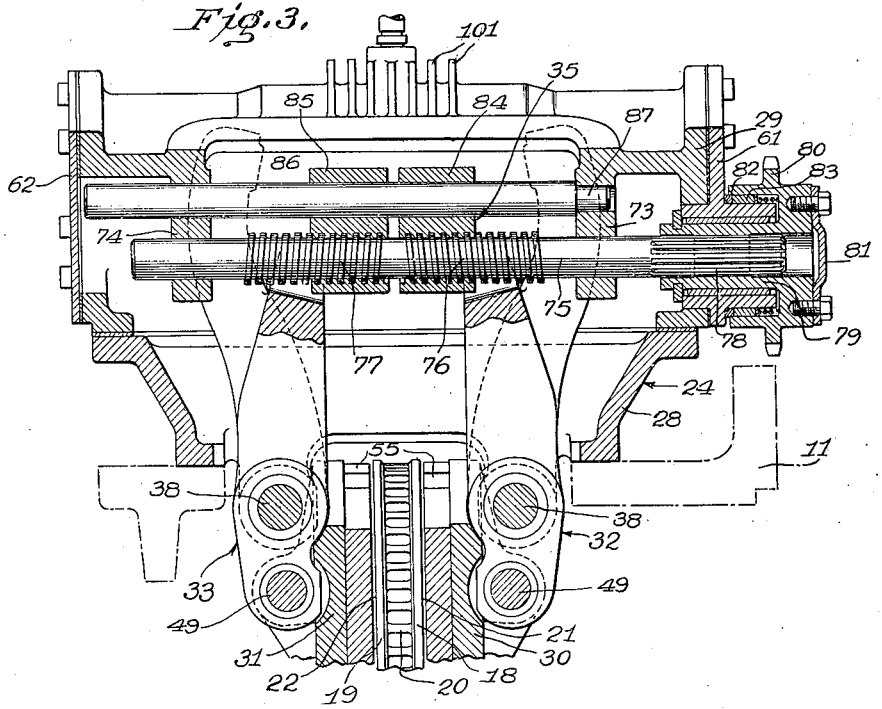
Figure 4:
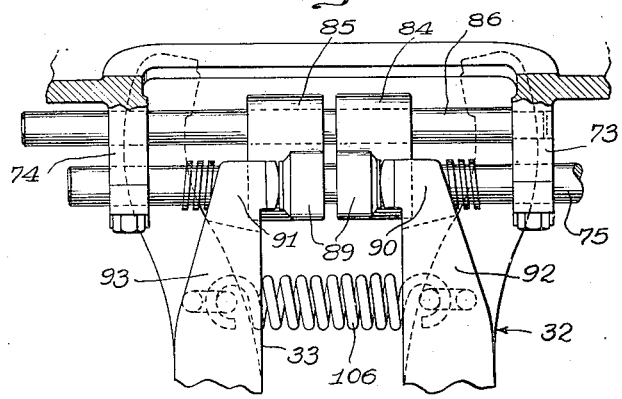

Figs. 3 and 4 are fragmentary sectional views taken, respectively, substantially along the lines 3—3 and 4—4 of Fig. 1 and looking in the direction of the arrows at the ends of the section lines.

Figure 2:
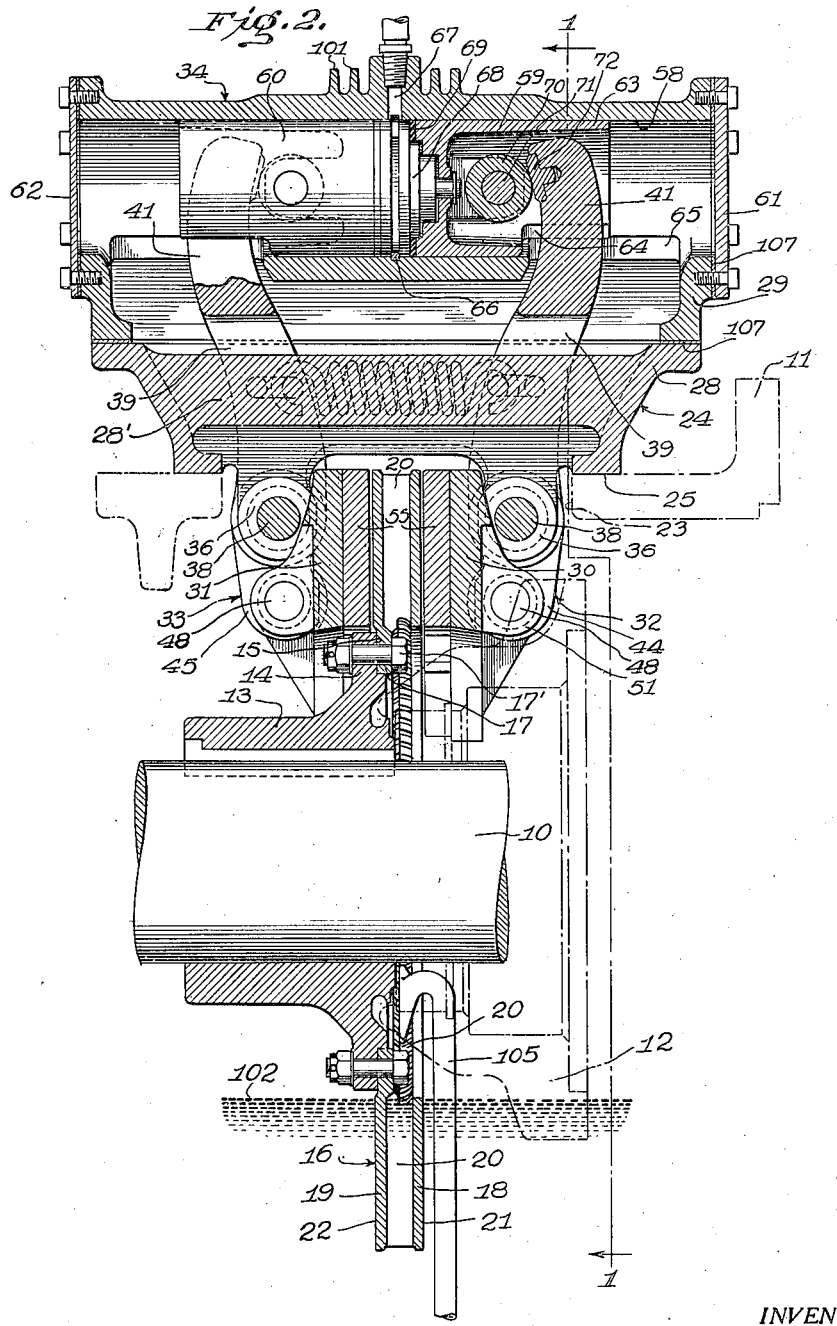
Fig. 2 is a sectional view of the brake mechanism taken substantially on the line 2—2 of Fig. 1, also looking in the direction of the arrows at the ends of the section line; this view also shows parts of a cooling system which may be employed in connection with the brake mechanism of the invention.
Figure 5:
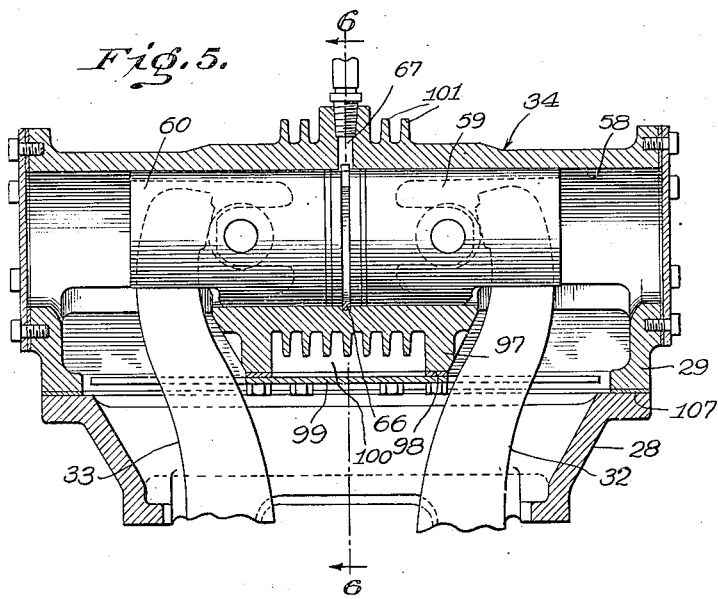
Figure 6:
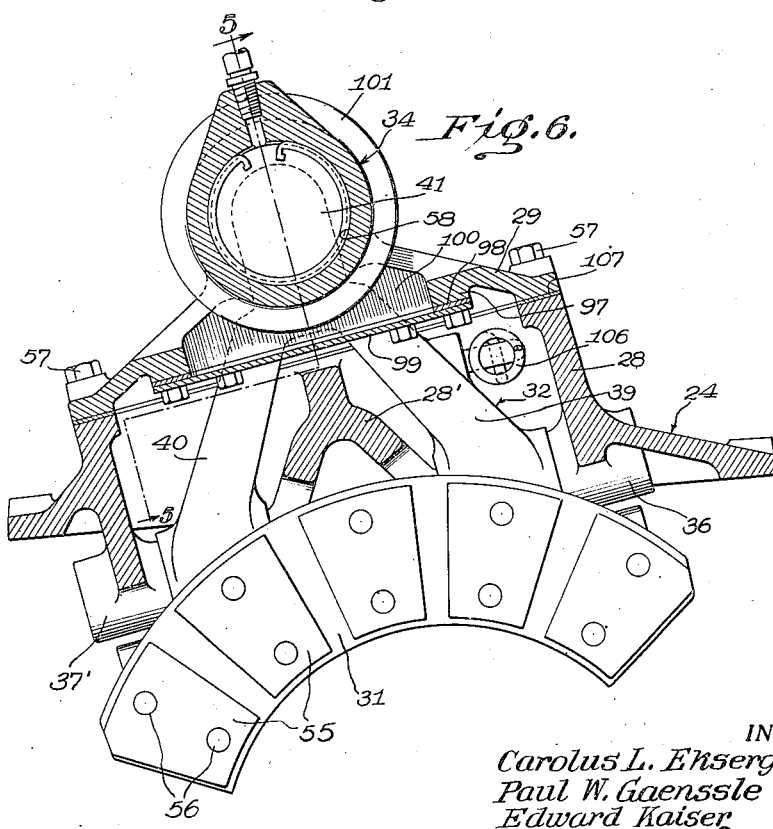

Fig. 5 is a fragmentary sectional view similar to Fig. 2 showing a modified form of brake mechanism in which no manually operated means is associated therewith, the section being taken substantially along the line 5—5 of Fig. 6 looking in the direction of the arrows at the ends of the section line.

Fig. 6 is a sectional view through the brake mechanism of Fig. 5, but showing the entire unit including the brake shoes, the section being taken substantially along the line 6—6 of Fig. 5 looking in the direction of the arrows at the ends of the section line.

In the drawings, the tank parts with which the brake mechanism is shown associated are indicated merely for the most part in dot-and-dash lines. Usually in such a tank there is a drive shaft for each tread, these shafts extending in transversely aligned relation and being driven from a source of power by a differential, similar to the usual drive to the rear wheels of an automobile. It is with one of these shafts that the brake mechanism of the invention is shown associated. By properly controlling the brakes associated with the shafts of the respective treads the tank can be maneuvered or controlled as desired.

Such a drive shaft is indicated in the drawings by the numeral 10 extending transversely through a gear casing 11 and supported therein by suitable bearings, one of which is indicated at 12, Fig. 2. To this shaft is splined a hub 13 which has a radial flange 14 formed on one side thereof with an annular seat 15. A brake ring designated generally by the numeral 16 has a flange 17 around its central opening which is seated in the annular seat 15 and secured therein by an annular series of bolts 17'. This brake ring forms the rotary element of the brake mechanism and comprises, radially outwardly of the flange 17, a pair of spaced brake rings 18 and 19 interconnected by a spaced series of generally radially extending braces or vanes 20 forming radial passages between the rings through which cooling medium may be circulated to aid in cooling the brake rings 18 and 19. The rings 18 and 19 have their axially outer faces provide radial braking faces 21 and 22 for engagement with the stationary brake members in a manner to be described hereinafter. The braking faces may be any suitable material, but one material which gives very satisfactory results is cast iron, and as shown, the entire brake ring 16 is cast in one piece. It is understood however that other forms of ring may be utilized, such, for example, as shown in Patent No. 2,214,762 granted September 17, 1940, for Brake, which has a flexible wrought metal flange connecting the cast iron ring, forming the braking faces, to the rotary member to be braked.

Opposite the brake ring 16, there is provided an elongated opening 23 in the top of the gear casing 11 which opening is adapted to be closed by a combined cover and brake mechanism casing unit designated generally by the reference character 24. The brake mechanism casing unit has a tight seated engagement at 25 all around the outside of the opening in the casing 11 and is strongly secured to its seat by spaced bolts, as 27. When so seated and secured it forms with the casing 11 a tightly closed gear casing and brake housing.

The combined cover and brake mechanism unit carries and houses most of the brake mechanism and its actuating means, some of which project within the casing 11 in final assembly into cooperative relation with the rotary brake ring 16.

For convenience of assembly and access the casing of unit 24 comprises an inner part 28 and an outer part 29. The inner part carries the segmental brake shoes 30 and 31 and their actuating levers or tongs 32 and 33 while the outer part 29 carries the actuating means, such as brake cylinder means designated generally by 34 and the manual actuating means designated generally by 35, Fig. 1.

The inner part 28 preferably comprises a casting having an elongated opening therethrough across the center of which extends a transverse brace 28'. On its inner side it carries spaced aligned sets of bearings for mounting the respective actuating levers 32 and 33. Each of said aligned sets of bearings includes four longitudinally spaced bearings 36, 36', 37, 37' in which is fitted a pivot pin 38 for the respective lever. As shown the pivot pins are inclined to the plane of attachment of the part 28 to the casing 11 which arrangement facilitates the driving of the pins in place and provides a somewhat more compact arrangement of the overall assembly.

Each lever or tong 32 and 33, comprises furcations 39 and 40 merging at their outer ends at 41 and pivoted intermediate their ends on the pins 38 at 42 and 43 between the respective spaced bearings 36 and 36' and 37 and 37'. The relatively short inner arms 44 and 45 of the furcations of the levers carry the respective brake shoes 30 and 31. These shoes are of arcuate form extending through approximately 120° of arc and are arranged to cooperate, respectively, with the opposed braking faces 21, 22 of the ring 16 to apply the brake.

The connection of each shoe to its actuating tong comprises a pivotal connection formed by pivot pins 48 and 49 passing, respectively, through spaced bearing bosses 50, 51 and 52, 53 on the back of the heavy plate forming the body of the shoe and the adjacent short arms 44 and 45 of the lever furcations. The bearing bosses are arranged on a line disposed in the plane including the center of gravity of the shoe and they are braced by ribs, as 54 to remote portions of the shoe back, thereby insuring that pressure applied to the shoe through its associated tong, is uniformly distributed over its entire area.

Each shoe, instead of having the brake lining, which may be a suitable composition lining, cover the entire area of the body plate, has this lining formed by spaced segmental blocks 55, see Fig. 6, secured to the body plate by screws as indicated at 56.

The cylinder unit or outer part 29 of the casing is removably bolted as a unit to the outer walls of the inner casing part 28 by bolts as 57. This part of the casing likewise, may be a casting in which is formed the cylinder bore 58, in which slide the actuating pistons 59 and 60. To permit easy assembly and disassembly of the pistons, the ends of the cylinder bore are closed by removable plates 61 and 62 securely screwed in place.

The pistons have long guide sleeves as 63 and to permit the passage of the outer ends, as 41, of the actuating levers or tongs to a position in line with the axis of the cylinder and pistons, these sleeves are slotted as shown at 64 and the inner wall of the cylinder is correspondingly slotted at 65.

To hold the pistons spaced at their inner inoperative position, any suitable means may be provided. The means shown comprises a split ring 66 which snaps into a groove formed in the cylinder wall. A port 67 leads through the cylinder wall to the space between the pistons, and fluid may be admitted through this port in the usual way to force the pistons outwardly and actuate the brakes.

To avoid leakage of fluid past the pistons they may be provided with any suitable packing. In the form shown the pressure face of the piston is formed by a separate movable member, as 68, having slight longitudinal movement with respect to the body of the piston, and between this movable member and the piston body is inserted a suitable packing ring as 69. The movable member may be normally held to keep the packing under a certain precompression. When pressure is applied between the pistons, the member 68 is moved with respect to the piston body to further compress the packing ring and force it with strong sealing pressure against the piston wall.

To minimize friction and wear between a piston and its associated lever, a roller 70 is mounted on a transverse pin 71 intersecting the axis of the piston and a hard metal bearing insert 72 may be secured to the end 41 of the associated lever for engagement with said roller in all relative positions of the piston and lever.

Where it is desired to associate a manual brake actuating means with the removable cover or brake mechanism unit, this may be done very compactly in the arrangement shown in Figs. 1, 3 and 4, by mounting for sliding movement in spaced lugs 73 and 74 extending from the side of the brake cylinder wall an actuating shaft 75 having right and left hand threads 76 and 77. This shaft has a splined connection at 78 with a sleeve 79 rotatably mounted in the end plate 61 closing the end of the brake cylinder casing. This sleeve has integrally secured thereto a sprocket gear or the like 80 through which it and the shaft 75 may be rotated by a chain (not shown) operated from a remote control station. The bore of the sleeve 79 receiving the shaft 75 is extended through the length of the sleeve, which is closed on its outer end by a removable plate 81. Suitable packing consisting of a packing ring 82 and spring pressed follower 83 is provided between the sprocket gear hub and the boss on the end plate 61, which it surrounds in spaced relation, to prevent leakage of oil from the bearing in the end plate.

The actuating shaft 75 threadably engages through its right and left screw threads 76 and 77, respectively, two correspondingly threaded blocks 84 and 85 which are prevented from rotating with the shaft, by a guide rod 86 on which they are slidable. This rod is supported at one end in lug 73 by a reduced diameter extension 87 therein fitting a hole in the lug and by a hole of the full diameter of the rod in the other lug 74. The other end of the rod terminates in close adjacency to the removable end plate 62 which normally holds it in place.

Each of the blocks 84 and 85 has laterally extending ears 88 and 89 projecting from the opposite sides thereof and these ears are adapted to be engaged, respectively, by the forked ends 90 and 91 of projections 92 and 93 integral, respectively, with the one of the furcations of the actuating levers or tongs 32 and 33.

To provide ready access to the manually actuated mechanism just described without removing the brake cylinder part of the casing, this part of the casing may be provided with an opening 94 opposite the location of the manually actuated mechanism, which opening is normally closed by a removable cover 95 secured in place by bolts, as 96.

Of course, in cases where no manual actuation means is provided in the casing, as in the form shown in Figs. 5 and 6, the construction may be correspondingly simplified and provision may readily be made to have cooling air flow around the entire circumference of the cylinder in its central portion. According to this form, the inner side of the cylinder wall and the cylinder casing wall is formed with an inwardly extending continuous wall 97 forming a flat plane seat 98 against which a plate as 99 may be bolted to close the communication from the inside of the inner casing part 28 to the outside. Between the outer face of this plate, the cylinder wall and the end portions of wall 97 are formed a passage 100, see Fig. 6, through which air may flow around the inner side of the cylinder.

To aid in cooling the cylinder the wall thereof is formed in this region with a plurality of spaced cooling fins 101 extending around the cylinder, in Figs. 5 and 6, and extending over half the circumference of the cylinder in Figs. 1, 2 and 3. The form in Figs. 5 and 6 provides somewhat better cooling of the cylinder because the air can circulate around the entire circumference of the cylinder. Part of this cooling action is sacrificed in the form of Figs. 1, 2 and 3, to obtain a compact combined fluid and mechanical actuation.

The brake mechanism according to this invention is entirely housed within a sealed casing so that no dust and dirt can enter and interfere with the proper functioning of the parts. Provision must therefore be made for adequate cooling of the brake parts in addition to the cooling of the cylinder walls by outside air currents.

Such cooling and at the same time adequate lubrication of all the moving parts within the casing is obtained by having the lower part of the rotating brake ring 16 immersed in the oil of the gear case 11, which oil may have a normal level as indicated at 102. Due to this arrangement the brake will at all times run wet, being bathed in oil thrown out centrifugally by the rotary motion of the disc, insuring a cool running of the brake and adequate lubrication of all parts. Additional cooling may be had by providing an oil circulating system as shown diagrammatically in Figs. 1 and 2, this system having a pump 103 connected to an outlet connected with the lower portion of the casing 11 to draw oil from the casing and circulate it by piping through a radiator 104 where the oil is cooled and through a return conduit or conduits leading it to a discharge spout or spouts 105 in the casing through the flaring ends of which it is directed into the radial channels between the brake rings for further cooling of the same.

The operation of the improved brake mechanism is believed fairly clear from the foregoing description but a brief description of the operation may not be amiss.

When the operator wishes to apply the brake, he admits hydraulic pressure from a source at a suitable control station to the conduit connected with the cylinder port 67, this pressure forcing the pistons outwardly and actuating the levers or tongs 32 and 33 to bring the respective shoes carried thereby into braking engagement with the opposite faces of the rotary brake disc 16. Due to the size of the pistons and the leverage advantage of the tongs, a powerful braking force may be applied, the force being equalized through the hydraulic medium. Due to the connection of the shoes to the levers and the stiff backing of the shoes the force is transmitted substantially equally over the entire area of the shoe in contact with the rotary ring. Thus uniformity of action and wear results. This powerful pressure upon the shoe blocks squeezes the contacting surfaces dry and thus increases the coefficient of friction. All this time the brake ring is running in oil and throwing it in all directions radially to maintain a thorough lubrication of parts and cooling action. The continuous circulation of oil in the oil cooling system assists this cooling action. The spacing of the blocks on the shoes also allows cooling oil to flow radially through the spaces between these blocks bounded on opposite sides by the shoe backing and the brake ring.

When the oil pressure in the cylinder is released by the operator's control, the parts are returned to inoperative position, as by a spring 106 connecting the outer arms of the brake levers or tongs, but the cooling and lubricating action continues during the running of the braked member.

If it is desired to apply the brakes mechanically, the operator from his control station, rotates the actuating shaft 75 through the sprocket or equivalent gear 80, which moves the blocks 84, and 85 right and left, respectively to swing the levers or tongs carrying the brake blocks into braking engagement with the rotary brake ring 16 as in the case of the hydraulic actuation. In this mechanical actuation, the pistons remain stationary in the cylinder and the pressures on the shoes are equalized by reason of the slidable mounting of the actuating shaft 75. The mechanical actuation can also serve to adjust the brakes, for upon release the sprocket may be turned just enough to secure the desired spacing of the shoes from the brake ring. It will be seen that the parts of the mechanical actuation are also exposed to the oil bath to which all parts inside the casing are subjected due to the rotation of the rotary ring partly submerged in the oil of the casing 11.

It will be understood that tight joints are provided between all parts of the casing which are separable, by providing suitable packing, as 107, as indicated in connection with certain of the joints.

While several specific embodiments of the invention have been described in detail it will be understood that changes and modifications might be made without departing from the main features of the invention and such changes and modifications as would readily fall within the skill of the artisan are intended to be covered by the terms of the claims appended hereto.

What is claimed is:

1. Brake mechanism comprising a rotary radially faced braking element, an arcuate braking element in cooperative relation thereto, said arcuate braking element being pivotally supported at spaced points by a bifurcated actuating lever, said lever being pivotally supported close to the pivot of said arcuate braking element and on an axis lying radially within the periphery of said arcuate braking element, the furcations of said lever merging at the extremity of the lever on the side of the pivot thereof opposite said arcuate braking element, and actuating means associated with said extremity of the lever.

2. Brake mechanism comprising a hollow casing open on one side and provided with an attaching face around said open side, a pair of non-rotary brake elements pivotally carried on spaced parallel pivots by actuating levers, respectively, pivoted on spaced parallel pivots adjacent the open side of said casing, and a brake cylinder forming a component part of the outer wall of said casing and carrying pistons for engagement with the respective levers to actuate the same, the portion of the outer wall of which the brake cylinder forms a part being removable from the remainder of the casing along a plane of division disposing the cylinder and the mounting of said levers respectively on opposite sides of said plane.

3. Brake mechanism comprising a hollow casing part open at one side and having an attaching seat extending around said open side and lying in a common plane, an actuating lever pivotally carried by said casing part adjacent the open side thereof and having an arm projecting beyond said casing part, a non-rotary brake element pivotally carried by said arm, said lever having another arm extending into the casing part, and a brake cylinder actuator for cooperation with said other arm, forming a component part of the outer wall of said casing part, the portion of the outer wall of said casing part of which the cylinder actuator forms a component part being removable from the remainder of the casing part along a plane of division disposing the cylinder wholly at the side thereof opposite the mounting of the lever.

4. Brake mechanism comprising a hollow casing part open at one side and provided with an attaching face around said open side, a brake lever pivotally carried intermediate its ends adjacent the open side of said casing part, an arm of said lever projecting beyond said casing part and pivotally carrying a non-rotary brake element, another arm of said lever extending into said casing part, and means within said casing part for engagement with said last-named arm for actuating said lever, said actuating means comprising independent fluid-actuated and mechanically-actuated means, said mechanically-actuated means also serving as means for adjustably limiting the return movement of said lever.

5. Brake mechanism comprising a hollow casing part open at one side and provided with an attaching face around said open side, an actuating lever pivotally carried by said casing part adjacent said open side thereof, said lever pivotally carrying a non-rotary brake element and having an arm extending into said casing part, and a brake cylinder forming an integral part of the outer wall of said casing part and connected for actuating said arm, the central portion of the cylinder being provided with spaced cooling fins extending radially therefrom so as to be exposed to the flow of the outside air.

6. Brake mechanism comprising a hollow casing part open at one side and provided with an attaching face around said open side, an actuating lever pivotally carried by said casing part adjacent said open side thereof, said lever pivotally carrying a non-rotary brake element and having an arm extending into said casing part, and a brake cylinder forming an integral part of the outer wall of said casing part and connected for actuating said arm, the central portion of the cylinder being wholly outside said casing part and being provided with spaced annular cooling fins in that region.

7. Brake mechanism comprising a hollow casing part open at one side and provided with an attaching face around said open side, an actuating lever pivotally carried by said casing part adjacent said open side thereof, said lever pivotally carrying a non-rotary brake element and having an arm extending into said casing part, and a brake cylinder forming a component part of the outer wall of said casing part and connected for actuating said arm, the brake cylinder carrying portion of said casing part being removable as a unit from the remaining portion of said casing part carrying the actuating lever and non-rotary brake element without detaching said remaining portion of the casing part, said cylinder carrying portion and the remaining portion being divided along a plane disposing the cylinder on a side thereof opposite the mounting of said actuating lever.

8. Brake mechanism comprising a hollow casing part open at one side and provided with an attaching face around said open side, an actuating lever pivotally carried by said casing part adjacent said open side thereof, said lever pivotally carrying a non-rotary brake element and having an arm extending into said casing part, and a brake cylinder including the ends thereof forming a component part of the outer wall of said casing part and connected for actuating said arm, the ends of the brake cylinder being readily removable to facilitate access to the interior thereof at all times without detaching said casing part.

9. Brake mechanism comprising a hollow casing part open at one side and provided with an attaching face around said open side, an actuating lever pivotally carried by said casing part adjacent said open side thereof, said lever pivotally carrying a non-rotary brake element and having an arm extending into said casing part, and a brake cylinder forming an integral part of the outer wall of said casing part and connected for actuating said arm, said connection comprising a piston slidable in the cylinder and having abutting engagement with said arm, said engagement being through an anti-friction roller.

10. Brake mechanism comprising a hollow casing part open at one side and provided with an attaching face around said open side, an actuating lever pivotally carried by said casing part adjacent said open side thereof, said lever pivotally carrying a non-rotary brake element and having an arm extending into said casing part, and a brake cylinder forming a portion of the outer wall of said casing, said cylinder portion of the casing being removable as a unit from the remaining portion of the casing part carrying said actuating lever and non-rotary brake element, said removable cylinder unit carrying manually-actuated means for engagement with said lever.

11. Brake mechanism comprising a hollow casing part open at one side and provided with an attaching face around said open side, an actuating lever pivotally carried by said casing part adjacent said open side thereof, said lever pivotally carrying a non-rotary brake element and having an arm extending into said casing part, and a brake cylinder forming a portion of the outer wall of said casing part and connected for actuating said arm, the casing part also carrying manually-actuated means for actuating said lever and having an opening, opposite said manually-actuated means, normally closed by a readily removable cover.

12. Brake mechanism comprising a brake support including separately fabricated casing parts having interseating faces meeting in a common plane, through which faces they are adapted to be joined together in final assembly to house elements of said mechanism, one of said parts pivotally carrying a brake lever, another of said parts carrying a cylinder and piston for actuating said lever, the piston and lever being arranged to abut when the parts are assembled and the common plane being disposed between the cylinder and lever pivot.

13. Brake mechanism comprising a brake support including a brake housing fabricated out of separate parts, one of said parts pivotally mounting a pair of brake levers carrying brake shoes and each having an arm extending through an opening in said part surrounded by a mounting seat, another casing part mounted on said seat and carrying a cylinder actuator disposed, when the parts are assembled, in cooperative relation to said arms, said cylinder actuator being disposed wholly on the side of said mounting seat opposite the pivots of said levers.

CAROLUS L. EKSERGIAN.
PAUL W. GAENSSLE.
EDWARD KAISER.